US011905080B2

(12) United States Patent
Gungner

(10) Patent No.: US 11,905,080 B2
(45) Date of Patent: Feb. 20, 2024

(54) CARTON FOR FOOD PRODUCTS

(71) Applicant: Graphic Packaging International, LLC, Atlanta, GA (US)

(72) Inventor: Greg Gungner, Cobourg (CA)

(73) Assignee: Graphic Packaging International, LLC, Atlanta, GA (US)

( * ) Notice: Subject to any disclaimer, the term of this patent is extended or adjusted under 35 U.S.C. 154(b) by 0 days.

(21) Appl. No.: 17/884,882

(22) Filed: Aug. 10, 2022

(65) Prior Publication Data

US 2023/0049212 A1 Feb. 16, 2023

Related U.S. Application Data

(60) Provisional application No. 63/260,158, filed on Aug. 11, 2021.

(51) Int. Cl.
*B65D 5/02* (2006.01)
*B65D 5/42* (2006.01)
(Continued)

(52) U.S. Cl.
CPC .............. *B65D 5/029* (2013.01); *B31B 50/73* (2017.08); *B65D 5/10* (2013.01); *B65D 5/4266* (2013.01);
(Continued)

(58) Field of Classification Search
CPC ........ B65D 5/029; B65D 5/10; B65D 5/4266; B65D 5/2047; B65D 5/2057;
(Continued)

(56) References Cited

U.S. PATENT DOCUMENTS

| | | | |
|---|---|---|---|
| 359,435 | A | 3/1887 | Elliott |
| 1,516,090 | A | 11/1924 | Gary et al. |

(Continued)

FOREIGN PATENT DOCUMENTS

| | | |
|---|---|---|
| CA | 2 586 472 | 5/2006 |
| DE | 203 00 817 | 4/2003 |

(Continued)

OTHER PUBLICATIONS

International Search Report and Written Opinion for PCT/US2022/039916 dated Nov. 22, 2022.

(Continued)

*Primary Examiner* — Christopher R Demeree
(74) *Attorney, Agent, or Firm* — Womble Bond Dickinson (US) LLP

(57) ABSTRACT

A carton for holding at least one food product includes a plurality of panels at least partially extending around an interior of the carton, the plurality of panels including a bottom panel, at least one side panel, at least one end panel, and an access panel. The carton further includes a plurality of end flaps foldably connected to a respective panel of the plurality of panels, the plurality of end flaps including a lid flap foldably connected to a respective panel of the plurality of panels for forming a closed end of the carton. The carton further includes leak-resistant features including a downwardly sloping arrangement of the at least one side panel and the at least one end panel toward the bottom panel to form a bottom receptacle for one or more fluids in the interior of the carton.

30 Claims, 5 Drawing Sheets

(51) Int. Cl.
*B31B 50/73* (2017.01)
*B65D 5/10* (2006.01)
*B31B 120/10* (2017.01)
*B31B 100/00* (2017.01)

(52) U.S. Cl.
CPC . *B31B 2100/0024* (2017.08); *B31B 2120/102* (2017.08)

(58) Field of Classification Search
CPC .. B65D 5/5455; B65D 5/6629; B65D 5/2014; B65D 5/4204; B65D 5/563; B31B 50/73; B31B 2100/0024; B31B 2120/102; A47G 21/001; A47J 36/022
USPC ........ 229/108, 126, 904, 114, 207; 206/562, 206/772; 426/112; 493/128
See application file for complete search history.

(56) References Cited

U.S. PATENT DOCUMENTS 2,108,343 A 2/1938 McAllister
2,132,966 A 10/1938 O'Brien
3,240,419 A 3/1966 Spiering et al.
3,324,998 A 6/1967 Farquhar
D211,564 S 7/1968 Bailey
3,637,130 A 1/1972 Farquhar
D234,396 S 2/1975 Killy
3,929,222 A 12/1975 Smith
4,190,757 A 2/1980 Turpin et al.
4,228,945 A 10/1980 Wysocki
4,267,420 A 5/1981 Brastad
4,449,633 A 5/1984 Johnson et al.
4,626,641 A 12/1986 Brown
4,775,771 A 10/1988 Pawlowski
4,780,587 A 10/1988 Brown
4,794,005 A 12/1988 Swiontek
4,865,921 A 9/1989 Hollenberg
4,890,439 A 1/1990 Smart
4,915,235 A 4/1990 Roosa
4,919,785 A 4/1990 Willey et al.
4,936,935 A 6/1990 Beckett
4,948,932 A 8/1990 Clough
4,963,424 A 10/1990 Beckett
5,020,717 A 6/1991 Cassidy
5,034,234 A 7/1991 Andreas et al.
5,039,364 A 8/1991 Beckett
5,071,062 A 12/1991 Bradley et al.
5,078,273 A 1/1992 Kuchenbecker
5,096,723 A 3/1992 Turpin
5,117,078 A 5/1992 Beckett
5,175,404 A 12/1992 Andreas et al.
5,213,902 A 5/1993 Beckett
5,221,419 A 6/1993 Beckett
5,260,537 A 11/1993 Beckett
5,266,386 A 11/1993 Beckett
RE34,683 E 8/1994 Maynard
5,340,436 A 8/1994 Beckett
5,354,973 A 10/1994 Beckett
5,410,135 A 4/1995 Pollart
5,424,517 A 6/1995 Habeger
5,484,100 A 1/1996 Rigby
5,510,132 A 4/1996 Gallo, Jr.
D369,972 S 5/1996 Solheim
5,519,195 A 5/1996 Keefer
5,585,027 A 12/1996 Young
5,628,921 A 5/1997 Beckett
5,672,407 A 9/1997 Beckett
5,688,427 A 11/1997 Gallo, Jr.
5,759,422 A 6/1998 Schmelzer
5,800,724 A 9/1998 Habeger
D407,970 S 4/1999 Planchard
5,938,110 A 8/1999 Bernstein
6,063,415 A 5/2000 Walters
6,114,679 A 9/2000 Lai
6,150,646 A 11/2000 Lai et al.
6,204,492 B1 3/2001 Zeng et al.
6,251,451 B1 6/2001 Zeng
D450,578 S 11/2001 Tomaselli et al.
6,414,290 B1 7/2002 Cole
6,433,322 B2 8/2002 Zeng et al.
6,455,827 B2 9/2002 Zeng
6,552,315 B2 4/2003 Zeng et al.
D484,798 S 1/2004 Bukowski
6,677,563 B2 1/2004 Lai
6,683,289 B2 1/2004 Whitmore et al.
6,717,121 B2 4/2004 Zeng
6,744,028 B2 6/2004 Chisholm et al.
6,765,182 B2 7/2004 Cole
D497,309 S 10/2004 Nordland
6,877,634 B2 4/2005 Tramontina et al.
D534,071 S 12/2006 Hoff
D573,458 S 7/2008 Anderson et al.
7,414,230 B2 8/2008 Fitzwater
D582,791 S 12/2008 Elmerhaus
7,473,875 B2 1/2009 Fitzwater
D600,940 S 9/2009 Elias et al.
D604,607 S 11/2009 Elias et al.
D608,194 S 1/2010 Gajardo
7,658,317 B2 2/2010 Wilkins
7,667,167 B2 2/2010 Fitzwater
D621,282 S 8/2010 Yagi
D626,010 S 10/2010 Criss et al.
7,851,730 B2 12/2010 Carmichael
7,893,389 B2 2/2011 Fitzwater
D635,469 S 4/2011 Buitrago
7,928,349 B2 4/2011 Fitzwater
D640,549 S 6/2011 Atkin
7,982,167 B2 7/2011 Fitzwater
D642,934 S 8/2011 Ly
8,061,265 B2 11/2011 Cambay
8,063,344 B2 11/2011 Cole et al.
D652,295 S 1/2012 Hipperson et al.
D657,261 S 4/2012 De Gast
D662,412 S 6/2012 Delaney et al.
D662,428 S 6/2012 Martinez Rodriguez
D664,444 S 7/2012 Delaney et al.
8,217,325 B2 7/2012 Russell et al.
D668,964 S 10/2012 Althoff
D670,557 S 11/2012 Hamina et al.
8,309,896 B2 11/2012 Fitzwater
8,353,398 B2 1/2013 DePaula et al.
8,440,947 B2 5/2013 Fitzwater
D688,939 S 9/2013 Pearson
D694,106 S 11/2013 Fitzwater
D694,124 S 11/2013 Fitzwater
D695,101 S 12/2013 Keberlein
8,872,078 B2 10/2014 Fitzwater
D719,443 S 12/2014 Jones et al.
D727,145 S 4/2015 Fitzwater
D728,359 S 5/2015 Iwegbu
D740,657 S 10/2015 Fitzwater
D743,810 S 11/2015 El-Afandi
D758,179 S 6/2016 Beck
D758,184 S 6/2016 Tu
D764,281 S 8/2016 Mayer
D766,081 S 9/2016 Adler
9,499,296 B2 11/2016 Mills
D786,063 S 5/2017 Choi
D786,091 S 5/2017 Fitzwater
D792,761 S 7/2017 Duval
D798,707 S 10/2017 Mayer
D800,553 S 10/2017 Fitzwater
D858,270 S 9/2019 Requena
10,457,466 B2 10/2019 Fitzwater
D870,556 S 12/2019 Tart
D876,951 S 3/2020 Sill
10,829,262 B2 11/2020 Sill
D961,380 S 8/2022 Holloway
11,465,798 B2 * 10/2022 Epstein ................. H04W 76/19
2003/0080120 A1 5/2003 Whitmore et al.
2003/0106899 A1 6/2003 Langen
2003/0206997 A1 11/2003 Winkleman et al.
2004/0023000 A1 2/2004 Young et al.

(56) References Cited

U.S. PATENT DOCUMENTS

| | | | |
|---|---|---|---|
| 2004/0101605 A1 | 5/2004 | Sigel | |
| 2005/0284865 A1 | 12/2005 | Fogle et al. | |
| 2006/0049190 A1 | 3/2006 | Middleton | |
| 2006/0096978 A1 | 5/2006 | Lafferty et al. | |
| 2006/0113300 A1 | 6/2006 | Wnek et al. | |
| 2007/0087090 A1 | 4/2007 | Russell | |
| 2007/0131742 A1 | 6/2007 | Fitzwater | |
| 2007/0131743 A1 | 6/2007 | Fitzwater | |
| 2007/0131744 A1 | 6/2007 | Fitzwater | |
| 2007/0131745 A1 | 6/2007 | Fitzwater | |
| 2007/0138247 A1 | 6/2007 | Fitzwater | |
| 2008/0308614 A1 | 12/2008 | Fitzwater | |
| 2009/0039077 A1 | 2/2009 | Fitzwater | |
| 2010/0193509 A1 | 8/2010 | Fitzwater | |
| 2011/0163090 A1 | 7/2011 | Fitzwater | |
| 2012/0037692 A1* | 2/2012 | Fitzwater | B65D 5/2076 229/126 |
| 2013/0026158 A1 | 1/2013 | Fitzwater | |
| 2013/0121624 A1 | 5/2013 | Lyzenga et al. | |
| 2013/0142921 A1 | 6/2013 | Fitzwater | |
| 2013/0341386 A1 | 12/2013 | Hubbard, Jr. et al. | |
| 2014/0263595 A1* | 9/2014 | Pantelleria | B65D 81/3858 229/120.37 |
| 2014/0263600 A1* | 9/2014 | Valencia | B65D 5/4204 229/162.1 |
| 2015/0129650 A1 | 5/2015 | Hubbard, Jr. et al. | |
| 2021/0147108 A1* | 5/2021 | Oliveira | B65D 5/6658 |
| 2021/0229854 A1 | 7/2021 | Epstein et al. | |
| 2022/0153468 A1* | 5/2022 | Epstein | B65D 5/029 |
| 2023/0049212 A1 | 2/2023 | Gungner | |
| 2023/0075117 A1* | 3/2023 | Epstein | B65D 5/2057 |

FOREIGN PATENT DOCUMENTS

| | | |
|---|---|---|
| EP | 1 452 458 A2 | 9/2004 |
| FR | 2 516 481 | 5/1983 |
| FR | 2 665 882 | 2/1992 |
| FR | 2 687 384 | 8/1993 |
| GB | 2 365 000 A | 2/2002 |
| JP | 2002-347756 | 12/2002 |
| JP | 2003-63565 | 3/2003 |
| JP | 2004 224402 A | 8/2004 |
| JP | 2014-227187 A | 12/2014 |
| RU | 00137412 | 7/2023 |
| WO | WO 2006/052326 A2 | 5/2006 |
| WO | WO 2007/067705 | 6/2007 |
| WO | WO 2009/023286 | 2/2009 |

OTHER PUBLICATIONS

U.S. Appl. No. 29/469,964, filed Oct. 16, 2013, Fitzwater.

Restaurantware Cake Box, posted at Amazon.com (date not available), [site visited Sep. 6, 2023]. Available from internet, URL:<https://www.amazon.com/Pastry-Box-Cake-Handle-Restaurantware/dp/B01N6EY3N5/> (Year: NA).

* cited by examiner

CARTON FOR FOOD PRODUCTS

CROSS-REFERENCE TO RELATED APPLICATION

This application claims the benefit of U.S. Provisional Patent Application No. 63/260,158, filed on Aug. 11, 2021.

INCORPORATION BY REFERENCE

The disclosures of each of U.S. Provisional Patent Application No. 63/260,158, filed on Aug. 11, 2021, and U.S. Design patent application No. 29/840,644, filed on May 31, 2022, are hereby incorporated by reference for all purposes as if presented herein in their entirety.

BACKGROUND OF THE DISCLOSURE

The present disclosure generally relates to cartons for holding one or more food products.

SUMMARY OF THE DISCLOSURE

According to one aspect, the disclosure is generally directed to a carton for holding at least one food product, the carton comprising a plurality of panels at least partially extending around an interior of the carton, the plurality of panels including a bottom panel, at least one side panel, at least one end panel, and an access panel, a plurality of end flaps foldably connected to a respective panel of the plurality of panels, the plurality of end flaps comprising a lid flap foldably connected to a respective panel of the plurality of panels for forming a closed end of the carton, and leak-resistant features including a downwardly sloping arrangement of the at least one side panel and the at least one end panel toward the bottom panel to form a bottom receptacle for one or more fluids in the interior of the carton.

According to another aspect, the disclosure is generally directed to a blank for forming a carton for holding at least one food product, the blank comprising a plurality of panels comprising a bottom panel, at least one side panel, at least one end panel, and an access panel, a plurality of end flaps foldably connected to a respective panel of the plurality of panels, the plurality of end flaps comprising a lid flap foldably connected to a respective panel of the plurality of panels for forming a closed end of the carton formed from the blank, the at least one side panel, the at least one end panel, and the bottom panel are for forming leak-resistant features of the carton formed from the blank including a downwardly sloping arrangement of the at least one side panel and the at least one end panel toward the bottom panel to form a bottom receptacle for one or more fluids in the interior of the carton formed from the blank.

According to another aspect, the disclosure is generally directed to a method of forming a carton for holding at least one food product, the method comprising obtaining a blank comprising a plurality of panels and a plurality of end flaps foldably connected to a respective panel of the plurality of panels, the plurality of panels comprising a bottom panel, at least one side panel, at least one end panel, and an access panel, the plurality of end flaps comprising a lid flap foldably connected to a respective panel of the plurality of panels. The method further comprises folding the plurality of panels at least partially around an interior of the carton, and forming leak-resistant features of the carton by positioning the at least one side panel and the at least one end panel in a downwardly sloping arrangement toward the bottom panel to form a bottom receptacle for one or more fluids in the interior of the carton.

Those skilled in the art will appreciate the above-stated advantages and other advantages and benefits of various additional embodiments reading the following detailed description of the embodiments with reference to the below-listed drawing figures.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION OF THE EXEMPLARY EMBODIMENTS

The present disclosure generally relates to cartons (e.g., carriers) with features for containing and facilitating dispensing articles such as food products, cooked food products, fried food products, hot and/or moist articles, etc. The articles can include, but are not limited to, fast food products, take-out products, meal leftovers, and the like, or any combination thereof. Examples of such products include, but are not limited to, fish, chicken (such as chicken nuggets, chicken strips, chicken fingers, etc.), popcorn, peanuts, candy, French fries (such as waffle fries, steak fries, shoestring fries, curly fries, etc.), French toast sticks, sandwich, pizza, calzone, turnover, burrito, sandwiches, wraps, pitas, or any other food product that may be packaged for consumption by a consumer. In this specification, the terms “inner,” “interior,” “outer,” “exterior,” “lower,” “bottom,” “upper,” and “top” indicate orientations determined in relation to fully erected and upright cartons.

As described herein, cartons may be formed by multiple overlapping panels, end flaps, and/or other portions of blanks. Such panels, end flaps, and/or other portions of the blanks can be designated in relative terms to one another, e.g., “first”, “second”, “third”, etc., in sequential or non-sequential reference, without departing from the disclosure.

Figure 1:
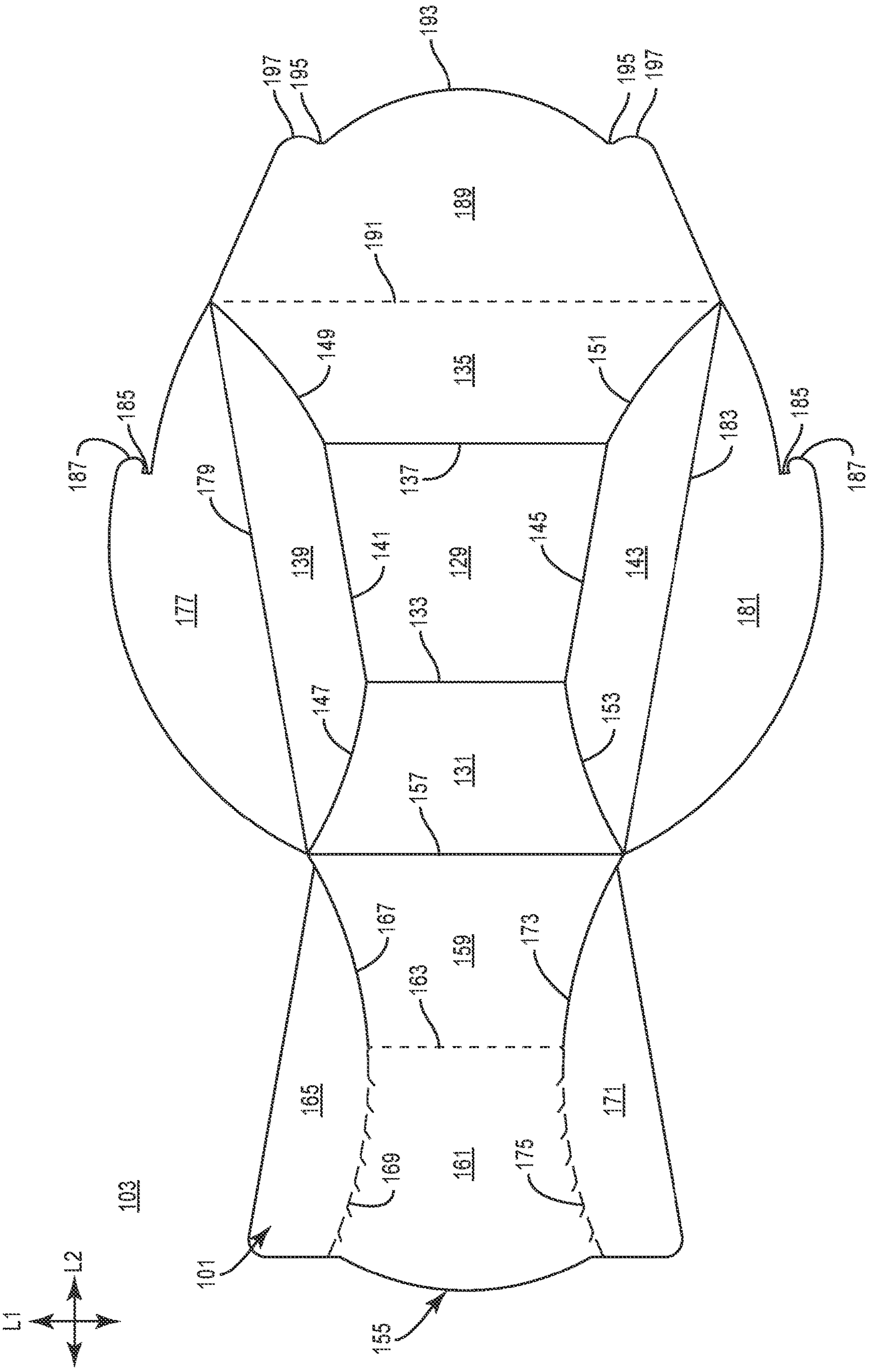
FIG. 1 is a plan view of an exterior surface of a blank used to form a carton according to an exemplary embodiment of the disclosure.

FIG. 1 is a plan view of an exterior surface 101 of a blank, generally indicated at 103, used to form a package or carton 105 (FIG. 2) according to an exemplary embodiment of the disclosure.

In the illustrated embodiment, the blank 103 has a longitudinal axis L1 and a lateral axis L2, and a plurality of panels for forming the carton 105 and extending around an interior 107 (FIG. 4) thereof.

Panels of the of the blank 103/carton 105 can include a base panel or bottom panel 129, a first end panel 131 foldably connected to the bottom panel 129 at a longitudinal crease line or fold line 133, a second end panel 135 foldably connected to the bottom panel 129 at a longitudinal crease line or fold line 137, a first side panel 139 foldably connected to the bottom panel 129 at a lateral crease line or fold line 141, and a second side panel 143 foldably connected to the bottom panel 129 at a lateral crease line or fold line 145.

As also shown, the first end panel 131 can be foldably connected to the first side panel 139 at an oblique and/or curved fold line 147, the first side panel 139 can be foldably connected to the second end panel 135 at an oblique and/or curved fold line 149, the second end panel 135 can be foldably connected to the second side panel 143 at an oblique and/or curved fold line 151, and the second side panel 143 can be foldably connected to the first end panel 131 at an oblique and/or curved fold line 153.

While the panels 129, 131, 135, 139, 143 having been described as discrete panels with respective foldable connections, in one embodiment, the panels 129, 131, 135, 139, 143 can be considered portions or sections of a base or central panel of the blank 103/carton 105.

An access panel 155 can be foldably connected to the first end panel 131 at a longitudinal fold line 157, and can have a base portion 159 foldably/separably connected to a distal portion 161 at a longitudinal tear line 163, with the base portion 159 foldably connected to the first end panel 131 at the fold line 157. As described herein, the distal portion 161 can be at least partially separable from the remainder of the carton 105 to provide access to the interior 107 of the carton 105.

With continued reference to FIG. 1, the blank 103/carton 105 also includes a plurality of end flaps foldably connected to a respective panel of the plurality of panels. As shown, a first attachment flap 165 can be foldably attached to the base portion 159 of the access panel 155 at a curved fold line 167 that intersects a curved tear line 169 at which the attachment flap 165 is foldably connected to the distal portion 161 of the access panel 155.

Similarly, a second attachment flap 171 can be foldably attached to the base portion 159 of the access panel 155 at a curved fold line 173 that intersects a curved tear line 175 at which the attachment flap 171 is foldably connected to the distal portion 161 of the access panel 155.

As also shown, a first locking flap 177 can be foldably connected to the first side panel 139 at an oblique fold line 179, and a second locking flap 181 can be foldably connected to the second side panel 143 at an oblique fold line 183. In the illustrated embodiment, the locking flaps 177, 181 can each include locking features that can have the form of a notch 185 (broadly, "first notch" and "second notch", respectively) formed therealong, defined between an extension 187 (broadly, "first extension" and "second extension", respectively) having the form of a protrusion/finger and a curved free edge of the respective locking flap 177, 181. In the illustrated embodiment, the extensions 187 can extend past the remainder of the respective locking flaps 177, 181.

A lid or lid flap 189 can be separably/foldably connected to the second end panel 135 at a longitudinal tear line 191. As described further herein, the lid flap 189 can define a curved locking edge 193 along at least a portion of a free edge thereof. The locking edge 193 can extend between a pair of notches 195 formed adjacent respective locking engagement features 197 protruding from the lid flap 189.

Figure 2:
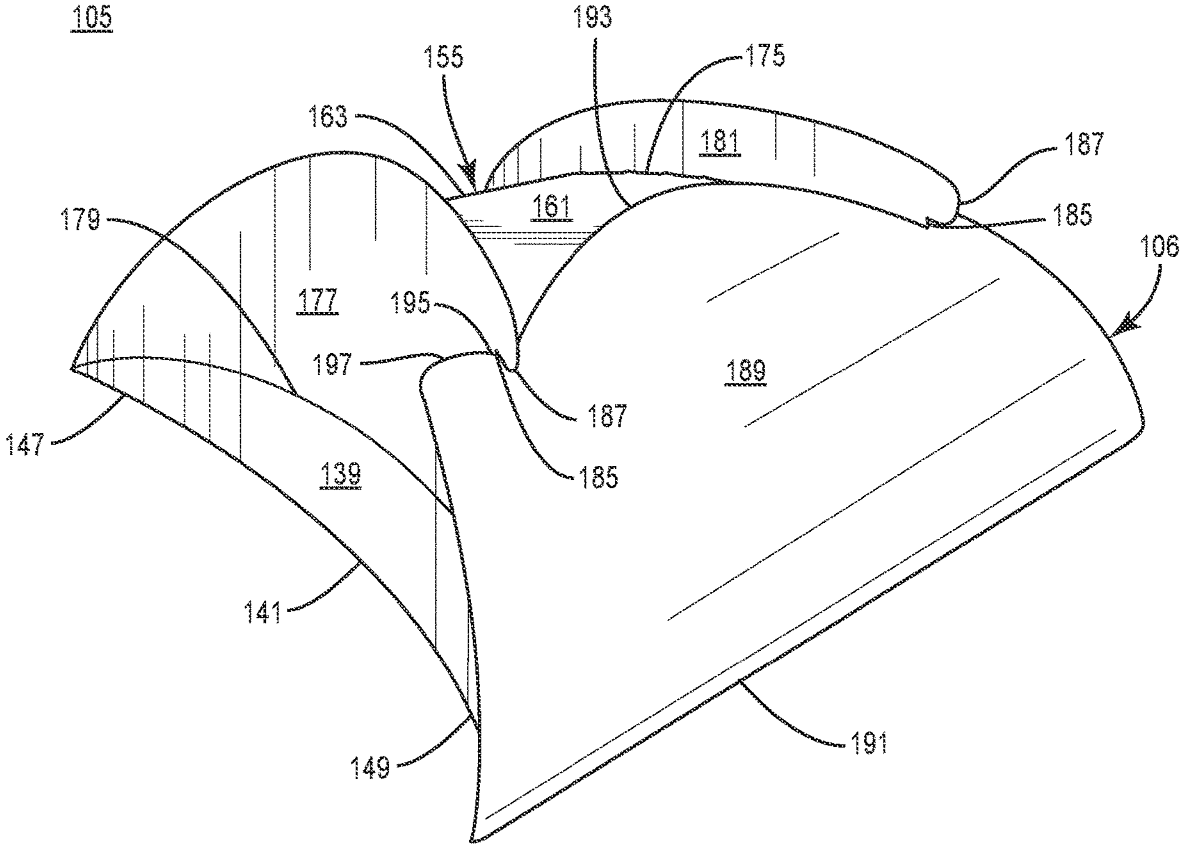
FIG. 2 is a perspective view of a carton formed from the blank of FIG. 1 and in a closed configuration according to an exemplary embodiment of the disclosure.
Figure 3:
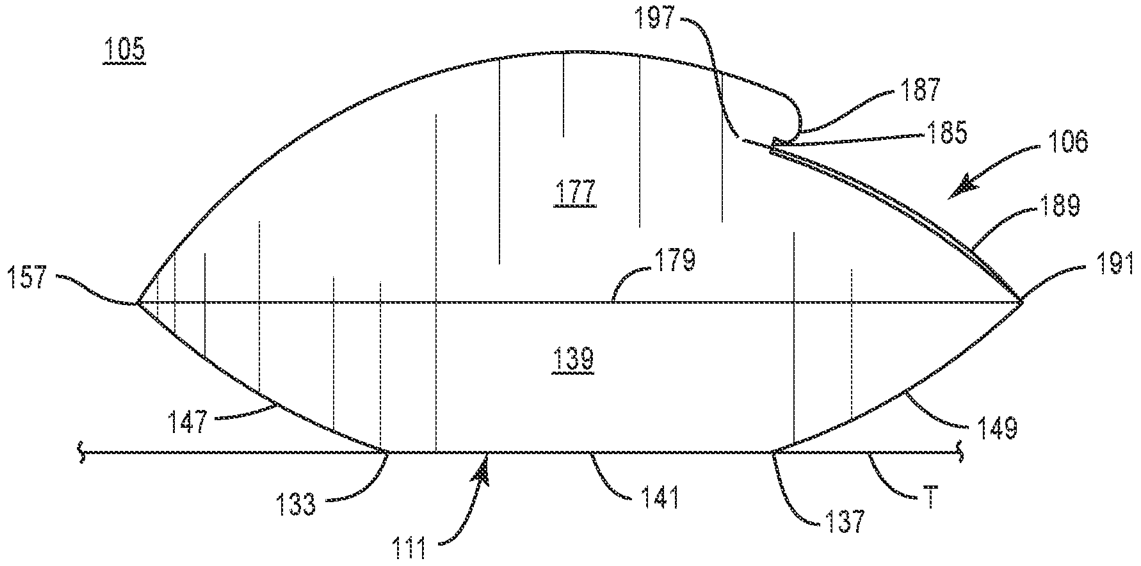
FIG. 3 is a side view of the carton of FIG. 2.

With additional reference to FIGS. 2 and 3, a method of forming the carton 105 from the blank 103 according to an exemplary embodiment of the disclosure can include inverting the blank 103 so as to position the exterior surface 101 thereof on a supporting surface and to position an interior surface thereof facing upwardly. The access panel 155 can be folded at the fold line 157 into at least partial face-to-face contact with respective portions of the end panel 131, the bottom panel 129, and the end panel 135.

Thereafter, the locking flaps 177, 181 can be folded at the respective fold lines 179, 183 into at least partial face-to-face contact with respective portions of the attachment flaps 165, 171 and the access panel 155. In some embodiments, the locking flaps 177, 181 can be attached to the respective attachment flaps 165, 171, for example, with an adhesive such as glue.

The aforementioned partially folded configuration of the blank 103/carton 105 can be grasped by an operator and/or one or more components of forming equipment so as to press/squeeze the blank 103/carton 105 proximate the respective fold lines 179, 183. Such movement of the blank 103/carton 105 can cause the locking flap 177 and the side panel 139 to move obliquely apart at the respective fold line 179 and can cause the locking flap 181 and the side panel 143 to move obliquely apart at the fold line 183.

Furthermore, the side panels 139, 143 can move at the respective fold lines 141, 145 into generally oblique/upright relation with respect to the bottom panel 129. By virtue of the foldable connections of the side panel 139, 143 to the end panels 131, 135 at the respective fold lines 147, 149, 151, 153, the end panels 131, 135 can be urged to move at the respective fold lines 133, 137 at least partially upwardly relative to the bottom panel 129.

In an open configuration of the carton 105, in which an end 106 of the carton 105 is open so as to provide access to the interior 107 (FIG. 4) of the carton 105, one or more food products can be placed in the interior 107 of the carton 105 in such a configuration.

The open end 106 of the carton 105 can be closed, in one embodiment, by folding the lid flap 189 at the fold line 191 to position the notches 195 of the lid flap 189 into general alignment with the notches 185 of the respective locking flaps 177, 183. In this regard, a closed condition of the carton 105, as illustrated in FIG. 2, can be achieved through the engagement of the notches 195 of the lid flap 189 with the respective notches of the locking flaps 177, 183, and can be at least partially maintained through the interfering/abutting relationship of the respective fingers 187 of the locking flaps 177, 181 with the respective locking engagement features 197 of the lid flap 189. In this regard, one or more of the lid flap 189 and the locking flaps 177, 181 can form closure features of the carton 105, with one or more of the respective engaging features thereof, e.g., notches 185, 195, protrusions/fingers 187, locking edges 193, and locking engagement features 197 forming locking features of the carton 105 for maintaining a closed configuration of the carton 105.

In the illustrated embodiment, the substantially continuous lower surface of the carton 105 formed at least by the foldably connected side panels 139, 143 and end panels 131, 135 in a downwardly sloping arrangement toward the bottom panel 129 to provide a bottom receptacle 109 in the interior 107 of the carton 105. In one embodiment, the receptacle 109 can be a fluid receptacle that tends to collect, capture, etc. one or more fluids associated with food products in the interior 107 of the carton 105. Such fluids can include one or more of runoff, condensed steam, condiments, toppings, drippings etc. In this regard, such fluids can be collected toward a bottom region of the interior 107 of the carton 105 so as to minimize, inhibit, avoid, and/or prevent the risk of spillage from the interior 107 of the carton 105 to an external environment. In this regard, the arrangement of panels 129, 139, 143, 131, 135 forming the bottom receptacle 109 can be fluid retention features or leak-resistant features of the carton 105.

Furthermore, the downwardly sloping arrangement of panels 129, 139, 143, 131, 135 that forms the receptacle 109 in the interior 107 of the carton 105 provides a complementary base 111 protruding from the underside of the carton 105, shown best in FIG. 3. In this regard, the base 111 can have a downwardly tapering structure formed by the oblique arrangement of the panels 131, 135, 139, 143 relative to the bottom panel, and that terminates at a generally flat end formed by the bottom panel 129. The flat end of the base 111 formed by the bottom panel 129 can provide platform upon which the carton 105 can rest on a supporting surface T in a stable arrangement, e.g., to avoid rocking, tilting, tipping, etc. In this regard, the arrangement of panels 129, 139, 143, 131, 135 forming the base 111 can be stabilizing features of the carton 105.

Figure 4:
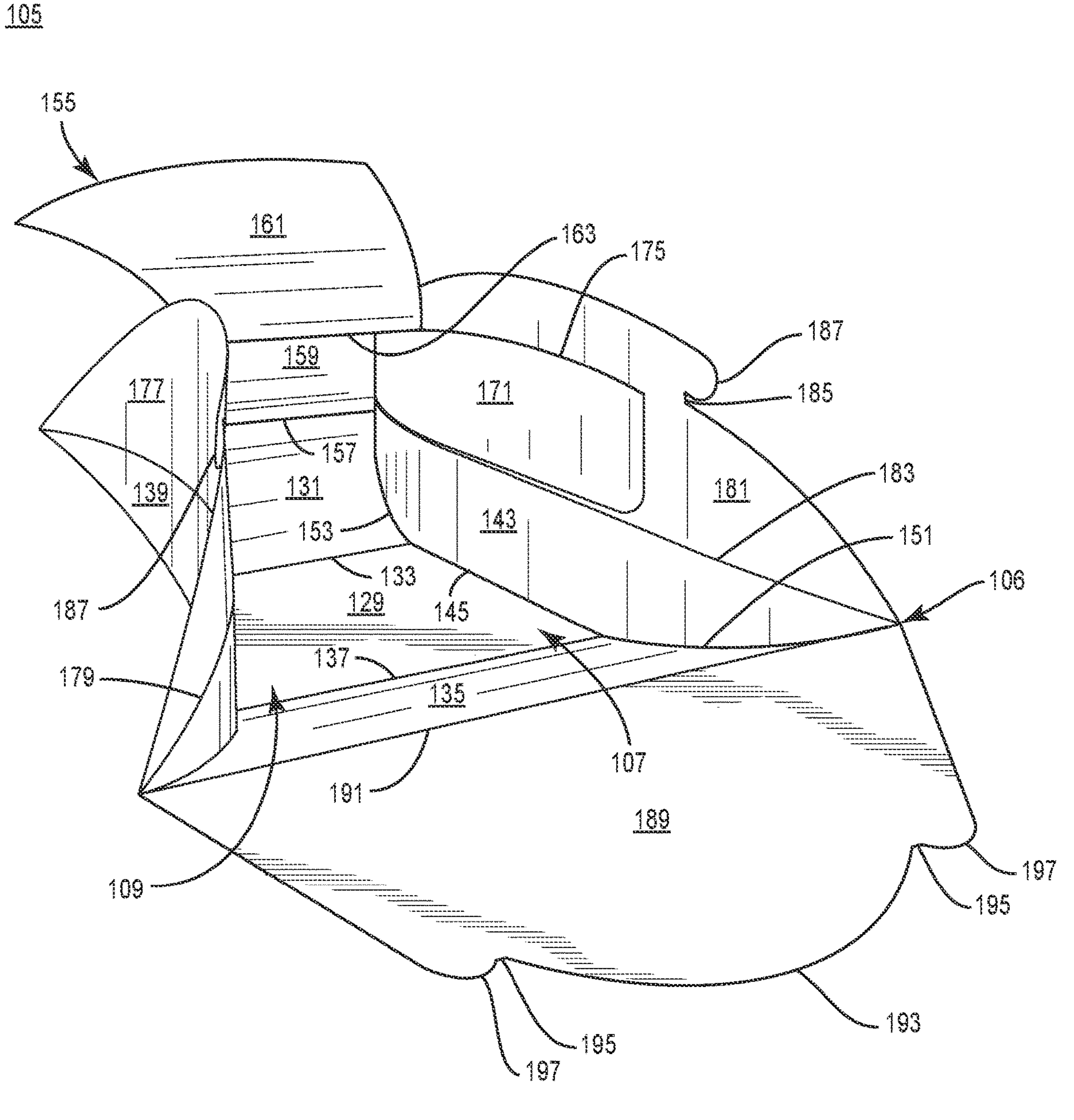
FIG. 4 is a perspective view of the carton of FIG. 2 in an open configuration.
Figure 5:
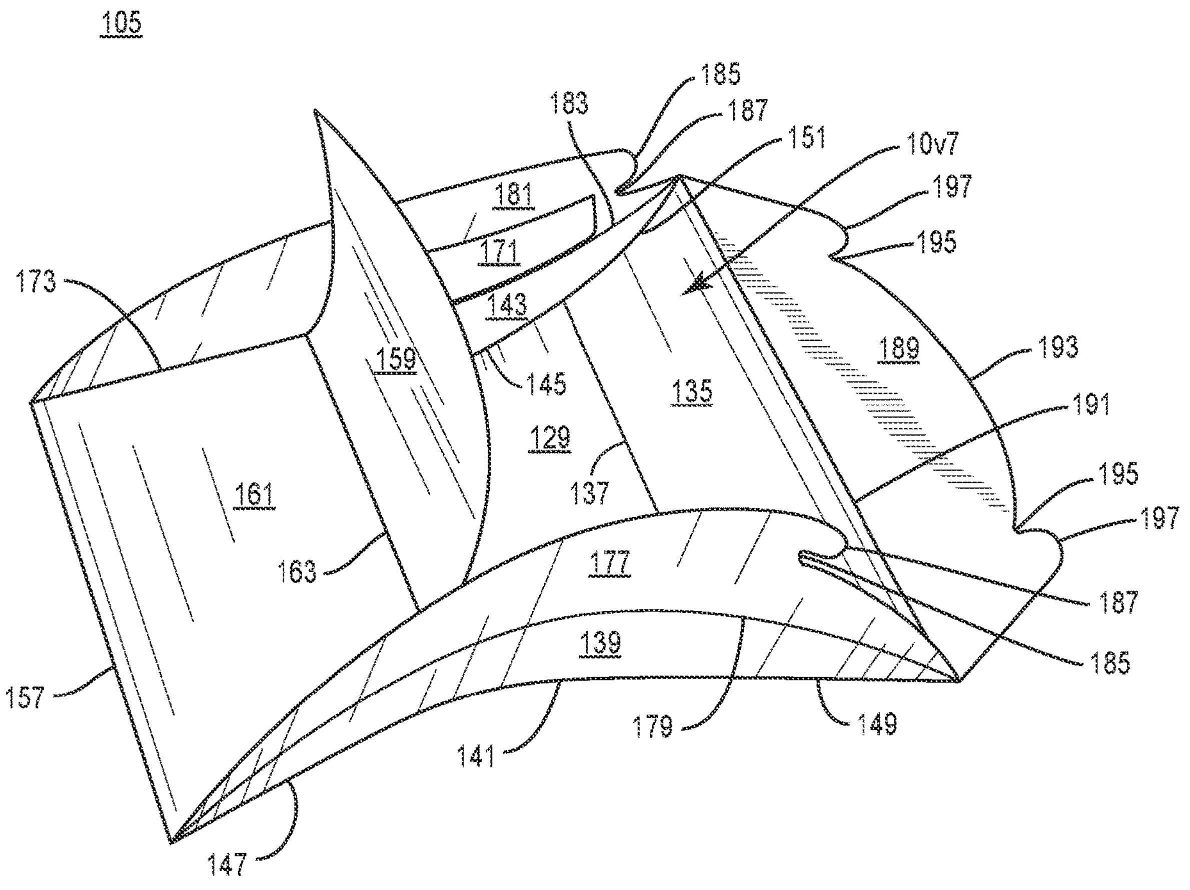
FIG. 5 is another perspective view of the carton of FIG. 2 in the open configuration.

Turning to FIGS. 4 and 5, when it is desired by a user/customer to access the interior 107 of the carton 105, the lid flap 189 can be engaged, for example, at the locking edge 193 and/or an interior surface of the lid flap 189 proximate the locking edge 193, and the lid flap 189 can be folded at the fold line 191 away from the interior 107 of the carton 105 so as to provide an opening into the interior 107 of the carton 105.

Should further/larger access to the interior 107 of the carton 105 be desired, the access flap 155 can be engaged by a user/customer, with the distal portion 161 of the access flap 155 folded away from the base portion 159 of the access flap 155 such that the distal portion 161 of the access flap 155 at least partially tears along the tear lines 169, 175 to cause at least partial separation from the respective attachment flaps 165, 171. In this regard, the access panel 155 and associated features can form access features of the carton 105.

In one embodiment, the distal portion 161 of the access flap 155 can be separated from the base portion 159 of the access flap 155 at the tear line 163, e.g., to provide additional/enhanced access to the interior 107 of the carton 105.

In the illustrated embodiment, the distal portion 161 of the access flap 155 can remain attached to the base portion 159 of the access flap 155, and can be folded at the tear line 163 toward the base portion 161 of the access panel 155.

Simultaneously or thereafter, the lid panel 189 can be folded at the fold line 191 to reclose the end of the carton 105 in the manner described above, e.g., to position the notches 195 of the lid flap 189 into general alignment with the notches 185 of the respective locking flaps 177, 181. In such an arrangement, the lid flap 189 can maintain the position of the distal portion 161 of the access flap 155 described above.

In one embodiment, the lid flap 189 can be separated from the remainder of the carton 105 at the tear line 191 to provide additional/enhanced access to the interior 107 of the carton 105.

The above-described construction of the carton 105 provides a unique configuration that is openable and reclosable, and selectively openable to at least a first open configuration, in which the lid flap 189 is folded away from the interior 107 of the carton 105, and a second open configuration, in which the lid flap 189 is folded away from the interior 107 of the carton 105 and the distal portion 161 of the access panel 155 is at least partially separated from the attachment flaps 165, 171 to provide additional access to the interior 107 of the carton 105. The carton 105 further provides a base 111 that allows the carton 105 to be stably placed on a supporting surface without assistance, the base 111 complementing an interior receptacle 109 that can direct and/or collect fluids, moisture, and/or other runoff in a leak-resistant construction.

The blanks according to the present disclosure can be, for example, formed from coated paperboard and similar materials. For example, the interior and/or exterior sides of the blanks can be coated with a clay coating. The clay coating may then be printed over with product, advertising, price coding, and other information or images. The blanks may then be coated with a varnish to protect any information printed on the blank. The blanks may also be coated with, for example, a moisture barrier layer, on either or both sides of the blanks. In accordance with the above-described embodiments, the blank may be constructed of paperboard of a caliper such that it is heavier and more rigid than ordinary paper. The blanks can also be constructed of other materials, such as cardboard, hard paper, or any other material having properties suitable for enabling the cartons, to function at least generally as described above. The blanks can also be laminated to or coated with one or more sheet-like materials at selected panels or panel sections.

In accordance with the above-described embodiments of the present disclosure, a fold line can be any substantially linear, although not necessarily straight, form of weakening that facilitates folding therealong. More specifically, but not for the purpose of narrowing the scope of the present disclosure, fold lines include: a score line, such as lines formed with a blunt scoring knife, or the like, which creates a crushed portion in the material along the desired line of weakness; a cut that extends partially into a material along the desired line of weakness, and/or a series of cuts that extend partially into and/or completely through the material along the desired line of weakness; and various combinations of these features.

As an example, a tear line can include: a slit that extends partially into the material along the desired line of weakness, and/or a series of spaced apart slits that extend partially into and/or completely through the material along the desired line of weakness, or various combinations of these features. As a more specific example, one type of tear line is in the form of a series of spaced apart slits that extend completely through the material, with adjacent slits being spaced apart slightly so that a nick (e.g., a small somewhat bridging-like piece of the material) is defined between the adjacent slits for typically temporarily connecting the material across the tear line. The nicks are broken during tearing along the tear line. The nicks typically are a relatively small percentage of the tear line, and alternatively the nicks can be omitted from or torn in a tear line such that the tear line is a continuous cut line. That is, it is within the scope of the present disclosure for each of the spaced apart slits to be replaced with a continuous slit, a continuous score, or the like. For example, a cut line can be a continuous slit or could be wider than a slit without departing from the present disclosure. Also, a tear line can be a series of cut scores passing completely, or partially, through the material, that are separated by nicks.

The term “glue” is intended to encompass all manner of adhesives commonly used to secure carton panels in place.

The foregoing description of the disclosure illustrates and describes various exemplary embodiments. Various additions, modifications, changes, etc., could be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A carton for holding at least one food product, the carton comprising:

a plurality of panels at least partially extending around an interior of the carton, the plurality of panels including a bottom panel, a first end panel foldably connected to the bottom panel, a second end panel foldably connected to the bottom panel, a first side panel foldably connected to the bottom panel, a second side panel foldably connected to the bottom panel, and an access panel, the first end panel foldably connected to the first side panel, the first side panel foldably connected to the second end panel, the second end panel foldably connected to the second side panel, and the second side panel foldably connected to the first end panel;

a plurality of end flaps foldably connected to a respective panel of the plurality of panels, the plurality of end flaps comprising a lid flap foldably connected to a respective panel of the plurality of panels for forming a closed end of the carton; and leak-resistant features including a downwardly sloping arrangement of the first end panel, the second end panel, the first side panel, and the second side panel toward the bottom panel to form a bottom receptacle for one or more fluids in the interior of the carton.

2. The carton of claim 1, wherein each of the first end panel, the second end panel, the first side panel, and the second side panel are obliquely arranged relative to the bottom panel.

3. The carton of claim 2, wherein the bottom panel has a flat profile providing a base for supporting the carton on a supporting surface in a stable arrangement.

4. The carton of claim 2, wherein the access panel comprises a base portion and a distal portion foldably connected to the base portion, the distal portion at least partially separable from the remainder of the carton to provide access to the interior of the carton.

5. The carton of claim 4, wherein the plurality of end flaps comprises at least one attachment flap foldably connected to the access panel, the distal portion of the access panel is at least partially separable from the at least one attachment flap.

6. The carton of claim 5, wherein the plurality of end flaps further comprises at least one locking flap foldably connected to the first side panel and attached to the at least one attachment flap.

7. The carton of claim 6, wherein the carton further comprises locking features for maintaining a closed configuration of the carton.

8. The carton of claim 7, wherein the locking features comprise a notch formed along the at least one locking flap for at least partially receiving a portion of the lid flap.

9. The carton of claim 8, wherein the notch is at least partially defined by an extension of the at least one locking flap, the extension protruding past the remainder of the at least one locking flap.

10. The carton of claim 9, wherein the at least one locking flap is a first locking flap foldably connected to the first side panel, the plurality of end flaps further comprises a second locking flap foldably connected to the second side panel, the notch is a first notch formed along the first locking flap, the extension is a first extension at least partially defining the first notch, and the locking features further comprise a second notch formed along the second locking flap for at least partially receiving a portion of the lid flap and a second extension protruding past the remainder of the second locking flap and at least partially defining the second notch.

11. A blank for forming a carton for holding at least one food product, the blank comprising:

a plurality of panels comprising a bottom panel, a first end panel foldably connected to the bottom panel, a second end panel foldably connected to the bottom panel, a first side panel foldably connected to the bottom panel, a second side panel foldably connected to the bottom panel, and an access panel, the first end panel foldably connected to the first side panel, the first side panel foldably connected to the second end panel, the second end panel foldably connected to the second side panel, and the second side panel foldably connected to the first end panel;

a plurality of end flaps foldably connected to a respective panel of the plurality of panels, the plurality of end flaps comprising a lid flap foldably connected to a respective panel of the plurality of panels for forming a closed end of the carton formed from the blank, the first end panel, the second end panel, the first side panel, the second side panel, and the bottom panel are for forming leak-resistant features of the carton formed from the blank including a downwardly sloping arrangement of the first end panel, the second end panel, the first side panel, the second side panel toward the bottom panel to form a bottom receptacle for one or more fluids in the interior of the carton formed from the blank.

12. The blank of claim 11, wherein the access panel comprises a base portion and a distal portion foldably connected to the base portion, the distal portion at least partially separable from the remainder of the blank to provide access to the interior of the carton formed from the blank.

13. The blank of claim 12, wherein the plurality of end flaps comprises at least one attachment flap foldably connected to the access panel, the distal portion of the access panel is at least partially separable from the at least one attachment flap.

14. The blank of claim 13, wherein the plurality of end flaps further comprises at least one locking flap foldably connected to the first side panel and for being attached to the at least one attachment flap when the carton is formed from the blank.

15. The blank of claim 14, wherein the blank further comprises locking features for maintaining a closed configuration of the carton formed from the blank.

16. The blank of claim 15, wherein the locking features comprise a notch formed along the at least one locking flap for at least partially receiving a portion of the lid flap when the carton is formed from the blank.

17. The blank of claim 16, wherein the notch is at least partially defined by an extension of the at least one locking flap, the extension protruding past the remainder of the at least one locking flap.

18. The blank of claim 17, wherein the at least one locking flap is a first locking flap foldably connected to the first side panel, the plurality of end flaps further comprises a second locking flap foldably connected to the second side panel, the notch is a first notch formed along the first locking flap, the extension is a first extension at least partially defining the first notch, and the locking features further comprise a second notch formed along the second locking flap for at least partially receiving a portion of the lid flap when the carton is formed from the blank and a second extension protruding past the remainder of the second locking flap and at least partially defining the second notch.

19. A method of forming a carton for holding at least one food product, the method comprising:

obtaining a blank comprising a plurality of panels and a plurality of end flaps foldably connected to a respective panel of the plurality of panels, the plurality of panels comprising a bottom panel, a first end panel foldably connected to the bottom panel, a second end panel foldably connected to the bottom panel, a first side panel foldably connected to the bottom panel, a second side panel foldably connected to the bottom panel, and an access panel, the first end panel foldably connected to the first side panel, the first side panel foldably connected to the second end panel, the second end panel foldably connected to the second side panel, and the second side panel foldably connected to the first end panel, the plurality of end flaps comprising a lid flap foldably connected to a respective panel of the plurality of panels;

folding the plurality of panels at least partially around an interior of the carton; and forming leak-resistant features of the carton by positioning the first end panel, the second end panel, the first side panel, and the second side panel in a downwardly sloping arrangement toward the bottom panel to form a bottom receptacle for one or more fluids in the interior of the carton.

20. The method of claim 19, folding the plurality of panels comprises positioning each of the first end panel, the second end panel, the first side panel, and the second side panel obliquely arranged relative to the bottom panel.

21. The method of claim 20, wherein the bottom panel has a flat profile providing a base for supporting the carton on a supporting surface in a stable arrangement.

22. The method of claim 20, wherein the access panel comprises a base portion and a distal portion foldably connected to the base portion.

23. The method of claim 22, further comprising at least partially separating the distal portion of the access panel from the remainder of the carton to provide access to the interior of the carton.

24. The method of claim 22, wherein the plurality of end flaps comprises at least one attachment flap foldably connected to the access panel, the distal portion of the access panel is at least partially separable from the at least one attachment flap.

25. The method of claim 24, wherein the plurality of end flaps further comprises at least one locking flap foldably connected to the first side panel, and the method further comprises attaching the at least one locking flap to the at least one attachment flap.

26. The method of claim 25, wherein the blank further comprises locking features for maintaining a closed configuration of the carton.

27. The method of claim 26, wherein the locking features comprise a notch formed along the at least one locking flap.

28. The method of claim 27, wherein the method comprises at least partially receiving a portion of the lid flap in the notch to maintain a closed configuration of the carton.

29. The method of claim 27, wherein the notch is at least partially defined by an extension of the at least one locking flap, the extension protruding past the remainder of the at least one locking flap.

30. The method of claim 29, wherein the at least one locking flap is a first locking flap foldably connected to the first side panel, the plurality of end flaps further comprises a second locking flap foldably connected to the second side panel, the notch is a first notch formed along the first locking flap, the extension is a first extension at least partially defining the first notch, and the locking features further comprise a second notch formed along the second locking flap for at least partially receiving a portion of the lid flap and a second extension protruding past the remainder of the second locking flap and at least partially defining the second notch.

* * * * *